United States Patent Office 3,425,722
Patented Feb. 4, 1969

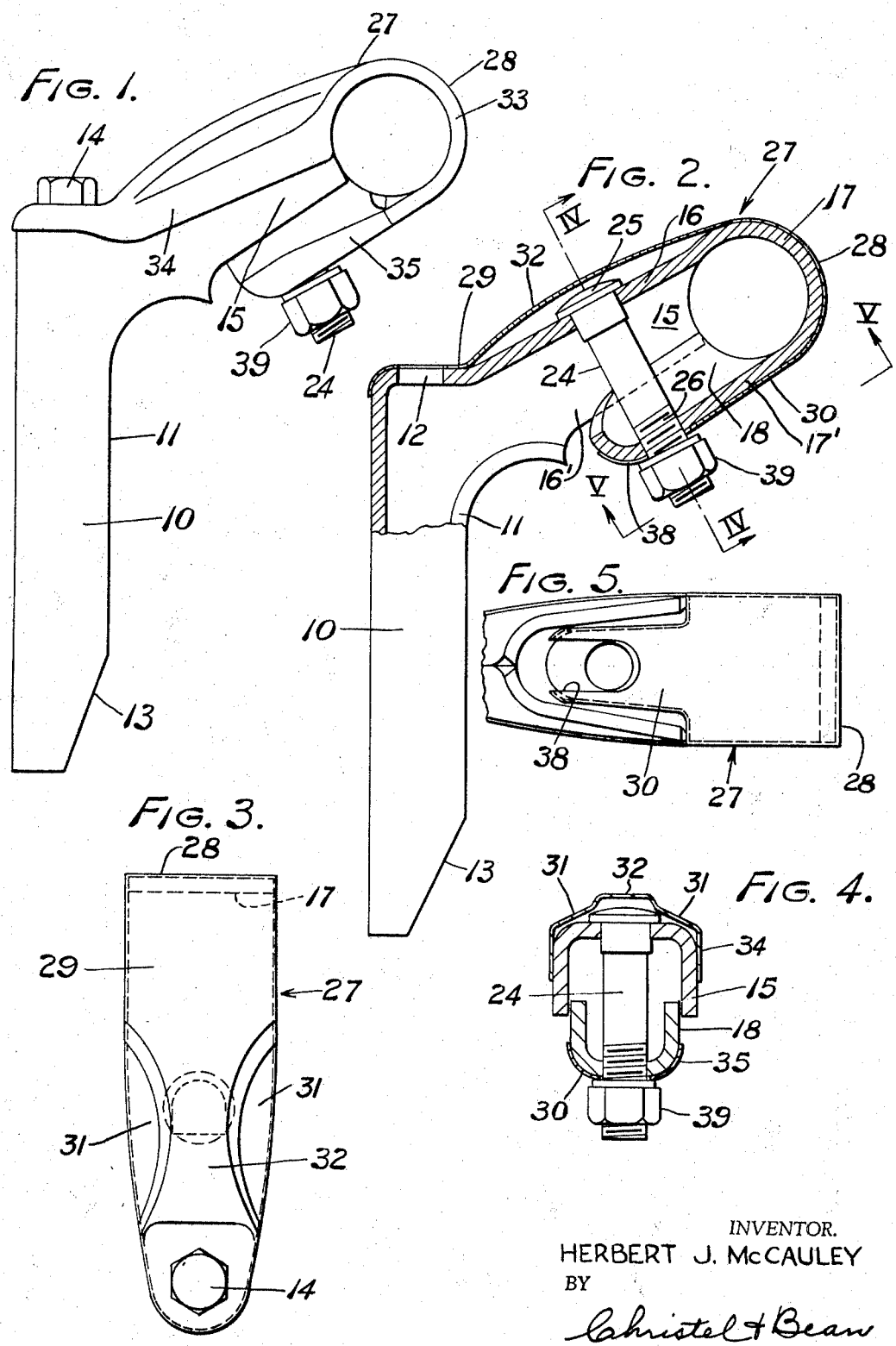

3,425,722
HANDLEBAR SUPPORT
Herbert J. McCauley, 86 Dana Road,
Buffalo, N.Y. 14216
Filed Feb. 1, 1967, Ser. No. 613,179
U.S. Cl. 287—52.02                                    2 Claims
Int. Cl. F16b 7/18, 39/24

ABSTRACT OF THE DISCLOSURE

A handlebar support having an offset upper handlebar engaging portion and a generally U-shaped shroud member adapted to fit over upper and lower surfaces of the offset portion and retained in assembly with such offset portion at its opposite ends by means of the bicycle stem securing bolt and the handlebar clamp bolt.

Background of the invention

This invention relates to a novel handlebar support for bicycles or other velocipedes or similar vehicles.

Handlebar supports are very well known elements in bicycles, velocipedes and other cycle constructions and comprise the connections between conventional handlebars and the upper journal of a velocipede or cycle steering fork, which journal bears in the head of the bicycle or cycle frame. Handlebar supports are commonly stamped from a single blank of relatively heavy sheet steel to comprise a generally upright cylindrical shank or stem and an axially offset extension which forms a circular handlebar receiving bearing. This bearing is conventionally formed by providing the offset extension with a return bent loop formation for receiving the handlebar. The medial horizontal portion of a handlebar is releasably clamped within the bearing by a bolt passing through the portions of the offset extension adjacent to the bearing loop.

Summary of the invention

Particularly in view of the heavy sheet metal employed in die-forming handlebar supports, it is virtually impossible to avoid irregularities and die marks in the handlebar support in the pressing process. It is accordingly necessary to finish such stampings, particularly the upper more exposed surfaces thereof, before the same can be chrome plated or otherwise finished. Furthermore, the heavy gauge of metal involved prevents the formation in the upper exposed surfaces of such supports of beads or trim formations of various kinds.

The present invention provides a relatively thin sheet metal shroud or casing member which is return bent to fit externally about the upper offset portion of the handlebar support, including the handlebar receiving bearing formation. In a preferred form this sheet metal shroud or casing is generally U-shaped and is retained in encasing relation with respect to the upper portion of the handlebar support by means of the handlebar clamp bolt and the screw or bolt which extends down through the stem portion of the handlebar support to clamp the same to a steering fork. The aforesaid two bolts are arranged to engage opposite ends of the U-shaped encasing member.

In addition to the general U formation of the encasing member, its transverse cross-section is generally channel-shaped to provide side flanges which extend across at least portions of the side surfaces of the handlebar support. In addition to covering or shrouding portions of the handlebar support per se which might display surface irregularities and die marks, the shrouding member which is of relatively light gauge metal may readily be embossed, particularly at its upper surface, to provide various desired design appearances, including surface formations which comprise sculptured motifs and which completely cover the upper exposed head portion of the handlebar clamp bolt and may further be embossed with the name of the bicycle manufacturer or other trademark or design indicia.

Brief description of the drawing

FIG. 1 is a side elevational view of a handlebar support provided with one form of the shrouding or encasing member of the present invention;

FIG. 2 is a view taken similarly to FIG. 1 but with the upper portion of the bicycle stem and encasing member in longitudinal cross-section;

FIG. 3 is a top plan view of the structure of FIGS. 1 and 2;

FIG. 4 is a cross-sectional view taken on the line IV—IV of FIG. 2; and

FIG. 5 is a fragmentary bottom plan view viewed approximately as indicated by the line V—V of FIG. 2.

Description of the preferred embodiment

Like characters of reference denote like parts in the several figures of the drawing and the metal stamping which forms the main body portion of the handlebar support of the present invention comprises a stem 10 press-formed into tubular shape, the opposite sides of the blank being brought together at 11 to complete the tubular formation. The upper end of stem 10 has an opening 12 and the lower end is beveled as at 13 for cooperation with a screw 14 and a conventional wedge, not shown, for securing stem 10 within the upper journal of a cycle fork, in a conventional manner.

The upper end of stem 10 is axially offset to provide an extension 15 which is generally of channel cross-section having a substantially planar web portion 16 and depending opposite sides 16'. The upper web portion of channel extension 15 extends outwardly and is return bent to provide a loop formation 17 which is adapted to engage the medial portion of a handlebar. The lower end of loop formation 17 extends toward stem 10 to provide a substantially planar web portion 17' and is shaped to form an upwardly facing channel 18, having the opposite sides 17'' upstanding from the web portion 17', which in the present instance fits within the channel formation 15. A bolt 24 passes through aligned openings in the channel portions 15 and 18 to releasably clamp a handlebar in the loop formation 17. The head 25 of the bolt is disposed on the web portion 16 and the threaded end 26 of the bolt depends from the lower channel 18.

The foregoing bicycle stem or handlebar support structure is substantially the same as that shown in my prior copending application Ser. No. 557,946, filed June 16, 1966.

The novelty of the present invention resides entirely in the encasing trim member which will now be described. A sheet metal member designated generally by the reference numeral 27 is of generally U-shaped form to provide a medial loop portion 28, an upper leg portion 29, and a lower leg portion 30. The sheet metal of member 27 is relatively thin and preferably of sufficient resilience for ready insertion over the offset extension and handlebar bearing formations described above in a manner clearly shown in FIG. 2.

The member 27 follows the contour of the aforesaid offset extension and bearing formation excepting for a portion of the upper leg formation 29 which is convexly formed as at 32 to allow clearance for the head of bolt 24 and give a more solid and three-dimensional appearance to the offset portion of the handlebar support. As may be seen in FIGS. 3 and 4, the convex portion 32 is provided on opposite sides thereof with depressed portions 31 which overlap and closely overlie opposite sides of the head 25 of the bolt 24. The member 27, and particularly the upper leg portion thereof, may take various sculptured forms for aesthetic reasons and, as indicated in the preamble hereto, may readily be embossed with the manufacturer's name or trademark, or other indicia.

The side edges of loop portion 28, upper leg portion 29, and lower leg portion 30, are provided with side flanges as at 33, 34 and 35, respectively. Such side flanges are shown in FIGS. 1 and 4.

Upper leg portion 29 is perforated at its outer end to register with the opening 12 of stem portion 10 whereby bolt 14 may be employed to retain this end of member 27 firmly against the upper end of stem 10. Similarly, the terminal portion of lower leg 30 of member 27 is bifurcated as at 38 to extend about bolt 24 and be retained by the nut 39 thereof. Thus the shrouding or encasing member 27 is readily held in secure but detachable encasing engagement with respect to the upper offset portion of the bicycle stem proper without any extra or extraneous fastening or attaching parts.

I claim:

1. In a handlebar support for cycles and the like, a body member comprising a unitary stamping formed from relatively heavy gauge sheet metal presenting a tubular stem and an axially offset extension at the upper end thereof, said offset extension having a downwardly facing channel adjacent said stem having a substantially planar web portion and depending opposite sides, an upwardly facing channel portion underlying and interfitting with said downwardly facing channel and having a substantially planar web portion and upstanding opposite sides, and the substantially planar portions of said channels being joined by a loop formation presenting a handlebar-receiving bearing formation, a bolt passing through said channels having a head disposed on said substantially planar portion of said downwardly facing channel and a threaded end depending from said substantially planar portion of said upwardly facing channel, and a nut engaged on said threaded end to draw said channels together for clamping said bearing formation upon an associated handlebar, and a trim member for the upper end of said stem and said extension, said trim member comprising an upper leg portion, a lower leg portion and a medial loop portion, said upper and lower leg portions each having depending opposite side flanges embracing, respectively, the opposite sides of said downwardly and upwardly facing channels, said opposite side flanges in each case extending around the respective free ends of said upper and lower leg portions to seat, respectively, around the upper end of said stem and the free end of said upwardly facing channel portion so that the trim member retains itself against removal from said body member, the free end portion of said lower portions having an opening receiving said threaded end of the bolt, and said upper leg portion having a convex portion between its free end and said medial loop portion overlying and clearing the upper end of said bolt to maintain said bolt captive within the assembly provided by the body and trim members.

2. The handlebar support as defined in claim 1 wherein said convex portion of said upper leg portion is provided with depressed portions along opposite sides thereof which overlap and closely overlie opposite sides of said head of the bolt.

References Cited

UNITED STATES PATENTS

| 1,605,123 | 11/1926 | Marple | 74—545 |
| 2,487,661 | 11/1949 | McCauley. | |

FOREIGN PATENTS 11,022    5/1959    Great Britain.

CARL W. TOMLIN, *Primary Examiner.*

WAYNE L. SHEDD, *Assistant Examiner.*

U.S. Cl. X.R.

74—545